United States Patent
Lerner et al.

(10) Patent No.: US 9,843,378 B2
(45) Date of Patent: Dec. 12, 2017

(54) MULTIPLE-INPUT MULTIPLE-OUTPUT WIRELESS TRANSCEIVER ARCHITECTURE

(75) Inventors: Gregory Lerner, Petach-Tikva (IL); Nir E J Tal, Haifa (IL); Ronen Shaul Isaac, Tel Aviv (IL); Roi Faust, Ra'anana (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1085 days.

(21) Appl. No.: 12/842,033

(22) Filed: Jul. 23, 2010

(65) Prior Publication Data

US 2011/0019723 A1    Jan. 27, 2011

Related U.S. Application Data

(60) Provisional application No. 61/228,218, filed on Jul. 24, 2009, provisional application No. 61/233,255, filed on Aug. 12, 2009.

(51) Int. Cl.
*H04B 1/38*      (2015.01)
*H04L 27/00*     (2006.01)
(Continued)

(52) U.S. Cl.
CPC ......... *H04B 7/0874* (2013.01); *H04B 7/0871* (2013.01); *H04L 27/0002* (2013.01); *H04L 5/0023* (2013.01)

(58) Field of Classification Search
CPC .. H04B 7/0871; H04B 7/0874; H04L 27/0002
(Continued)

(56) References Cited

U.S. PATENT DOCUMENTS 5,712,870 A * 1/1998 Petrick .................... 375/147
2006/0250182 A1* 11/2006 Takeda et al. ........... 330/129
(Continued)

OTHER PUBLICATIONS

Gireesh Rajendran, Anand Kannan and Krishnaswamy Thiagarajan, U.S. Appl. No. 12/892,976, filed Sep. 29, 2010, "Multiple-Input Multiple-Output Wireless Transceiver Architecture" pp. 22.

*Primary Examiner* — Ross Varndell
(74) *Attorney, Agent, or Firm* — Ronald O. Neerings; Charles A. Brill; Frank D. Cimino

(57) ABSTRACT

A wireless transceiver contains a receiver and a transmitter. The receiver is operable in single-input single-output (SISO) mode as well as multiple-input multiple-output (MIMO) mode, and contains a pair of in-phase and quadrature signal processing chains and a baseband processor. In SISO mode, each of the processing chains in the pair is connected to receive a same modulated signal as input, and generates respective baseband outputs. The baseband processor processes the baseband outputs to demodulate the modulated signal. In MIMO mode, the signal processing chains in the pair receive different modulated signals and generate corresponding down-converted signals. The baseband processor processes the down-converted signals to demodulate the respective modulated signals received by the receiver. Corresponding techniques to provide MIMO in addition to SISO capabilities are implemented in the transmitter also. MIMO capability is thereby achieved in the wireless transceiver with minimal additional implementation area.

18 Claims, 7 Drawing Sheets

(51) Int. Cl.
*H04B 7/08* (2006.01)
*H04L 5/00* (2006.01)

(58) Field of Classification Search
USPC .......... 375/219, 260, 279; 342/194; 370/206
See application file for complete search history.

(56) References Cited

U.S. PATENT DOCUMENTS

2007/0298748 A1* 12/2007 Banh et al. ................... 455/296
2010/0142416 A1* 6/2010 Kim ............................. 370/281

\* cited by examiner

MULTIPLE-INPUT MULTIPLE-OUTPUT WIRELESS TRANSCEIVER ARCHITECTURE

RELATED APPLICATION(S)

The present application claims the benefit of U.S. provisional application Ser. No. 61/233,255, entitled: "Area-Effective Hardware for MIMO Transciever", filed on Aug. 12, 2009, and U.S. provisional application Ser. No. 61/228,218, entitled: "Area-Effective Hardware for MIMO Transciever", filed on Jul. 24, 2009, both of which are incorporated in their entirety herewith.

BACKGROUND

Technical Field

Embodiments of the present disclosure relate generally to wireless transceivers, and more specifically to Multiple-Input-Multiple-Output (MIMO) wireless transceiver architecture.

Related Art

A wireless transceiver receives and transmits signals wirelessly (on a wireless medium), and contains corresponding receive and transmit circuits. Some examples of wireless devices are mobile phones, personal digital assistants (PDA), etc. A wireless transceiver may contain one or more antennas for transmitting and receiving the corresponding signal(s) on the wireless medium. Transceiver architecture generally refers to the arrangement of circuits/components in the receiver and their interconnections for performing the desired transmit and receive operations.

Multiple-input-multiple-output (MIMO) approaches may be used in wireless transceivers. A MIMO approach uses multiple antennas at both the transmitter and the receiver side for respective transmit and receive operations. Since multiple antennas are used, multiple signals may be transmitted and received in parallel, thereby providing several benefits such as increased data throughput, mitigation of multipath effects, etc.

SUMMARY

This Summary is provided to comply with 37§C.F.R. §1.73, requiring a summary of the invention briefly indicating the nature and substance of the invention. It is submitted with the understanding that it will not be used to interpret or limit the scope or meaning of the claims.

A wireless transceiver contains a receiver and a transmitter. The receiver is operable in single-input single-output (SISO) mode as well as multiple-input multiple-output (MIMO) mode, and contains a single pair of signal processing chains and a baseband processor. In SISO mode, each of the processing chains in the pair is connected to receive a same modulated signal as input, and generates respective baseband outputs. The baseband processor processes the baseband outputs to demodulate the modulated signal. In MIMO mode, the signal processing chains in the pair receive different modulated signals and generate corresponding down-converted signals. The baseband processor processes the down-converted signals to demodulate the respective modulated signals.

The transmitter is also operable in both the SISO mode and MIMO mode, and contains a single pair of signal processing chains and a transmit processor. In SISO mode, the transmit processor generates in-phase (I) data and quadrature-phase (Q) data to be transmitted on a (same) modulated signal. The respective processing chains in the pair receive the I data and the Q data and generate corresponding analog signals that are combined to form the modulated signal that is transmitted. In MIMO mode, the transmit processor generates two sets of data, each set to be transmitted on a corresponding one of two modulated signals. One chain in the pair of signal processing chains receives a first one of the two sets of data and generates the first modulated signal, the second signal processing chain to receive the second set of data and to generate the second modulated signal.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

The drawing in which an element first appears is indicated by the leftmost digit(s) in the corresponding reference number.

DETAILED DESCRIPTION

1. Example Environment

Figure 1:
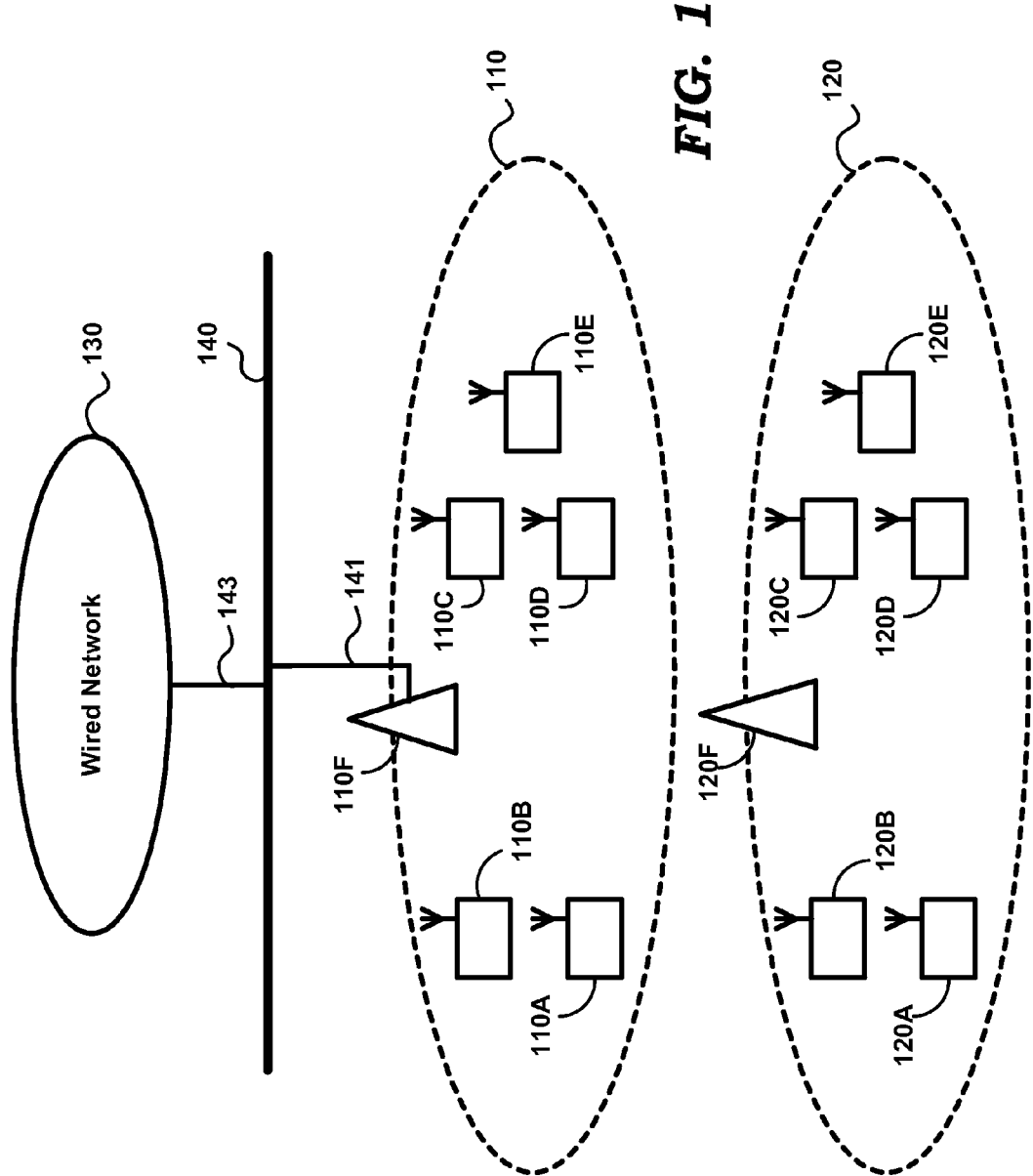
FIG. 1 is a block diagram of an example environment in which several embodiments can be implemented.

FIG. 1 is a block diagram illustrating an example environment in which several embodiments may be implemented. The example environment is shown containing only representative systems for illustration. However, real-world environments may contain many more systems/components as will be apparent to one skilled in the relevant arts.

The diagram is shown containing two Basic Service Sets (BSS) 110 and 120, wired network 130, and wired network backbone 140. In the example environment shown in FIG. 1, the respective components are assumed to be designed to operate consistent with the 802.11 WLAN standards (including revisions such as 802.11a, 802.11b, 802.11g, 802.11n, etc.). However, the features can be implemented in various other environments and according to other standards or protocols as well, including WiMAX (Worldwide Interoperability for Microwave Access), UMTS (Universal Mobile Telecommunications System), 3GPP Long Term Evolution (LTE), etc.

BSS 110 contains wireless transceivers 110A through 110E, and access point (AP) 110F. Each of wireless transceivers 110A through 110E may be any electronic/computing device (mobile or fixed) equipped with a wireless network interface that enables wireless communication. For example, wireless transceivers 110A through 110E may include devices such as laptops, desktops, personal digital assistants (PDA), mobile phones, etc.

AP 110F is connected by a wired medium (141) to wired network backbone 140, which in turn is connected to wired network 130. AP 110F provides wireless transceivers 110A through 110E connectivity with each other. Thus, for example, if wireless transceiver 110A is to communicate (transfer data to) with wireless transceiver 110C, it may do so by first communicating with AP 110F, which in turn communicates with wireless transceiver 110C. Thus, a wireless transceiver (any of 110A-110E) wanting to communicate with another wireless transceiver in BSS 110 may do so via AP 110F. AP 110F also provides wireless transceivers 110A-110E connectivity to wired network 130 and transceivers in BSS 120. Each of wireless transceivers 110A through 110E in BSS 110 may also communicate with each other directly, without requiring the mediation of AP 110F.

BSS 120 and constituent components wireless transceivers 120A through 120E and AP 120F operate in a manner similar to that described above with respect to BSS 110, and the related description is not repeated here in the interest of conciseness.

All transceivers in BSS 110 and BSS 120 may communicate with each other on a shared frequency band such as, for example, the 2.4 GHz (or 5.1 GHz) band specified by WLAN standards. The transceivers may operate in the same channel or different channels (adjacent or overlapping) within a shared band.

The transceivers (wireless devices, in general) of FIG. 1 may be designed to operate in one or more of several modes of operation such as single-input-single-output (SISO) mode, MIMO mode, etc. In SISO mode, a pair of transmitting and receiving transceivers communicates in any interval using only one pair of antennas (one each at the transmitting and the receiving ends), and thus only one wireless signal may be transmitted (and received) in any time interval. In MIMO mode as noted above, multiple antennas are employed at both the transmitter and the receiver side, and multiple signals may be transmitted and received in parallel. The implementation of a wireless transceiver in an embodiment is described in sections below. Implementation of the receiver portion of the transceiver is described first.

2. Receiver

Figure 2:
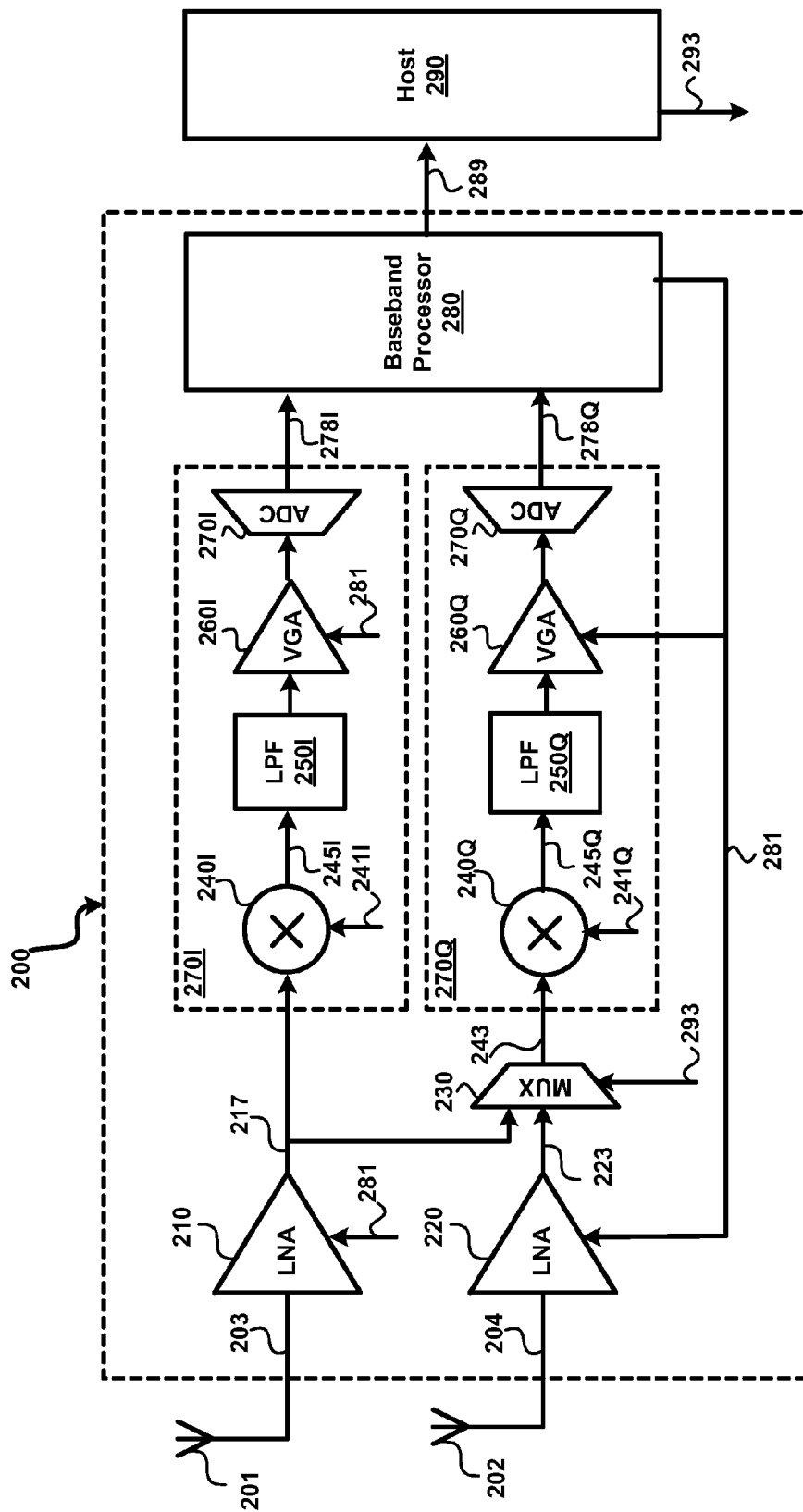
FIG. 2 is a block diagram illustrating the details of a receiver portion of a transceiver, in an embodiment.

FIG. 2 is a diagram illustrating the details of a receiver portion of a transceiver (e.g., transceiver 110A of FIG. 1), in an embodiment. Receiver 200 is shown containing low noise amplifiers (LNA) 210 and 220, multiplexer (MUX) or RF-switch 230, mixers 240I and 240Q, low pass filters (LPF) 250I and 250Q, variable-gain amplifiers (VGA) 260I and 260Q, analog to digital converters (ADC) 270I and 270Q and baseband processor 280. Host 290 and antennas 201 and 202 are also shown in FIG. 2. Host 290 may correspond to a processor or other device, and receives demodulated data on path 289 and implements a corresponding desired function. One example of such a function is for host 290 to display received data on a display device (not shown, but such as a screen contained in a mobile phone).

Figure 5:
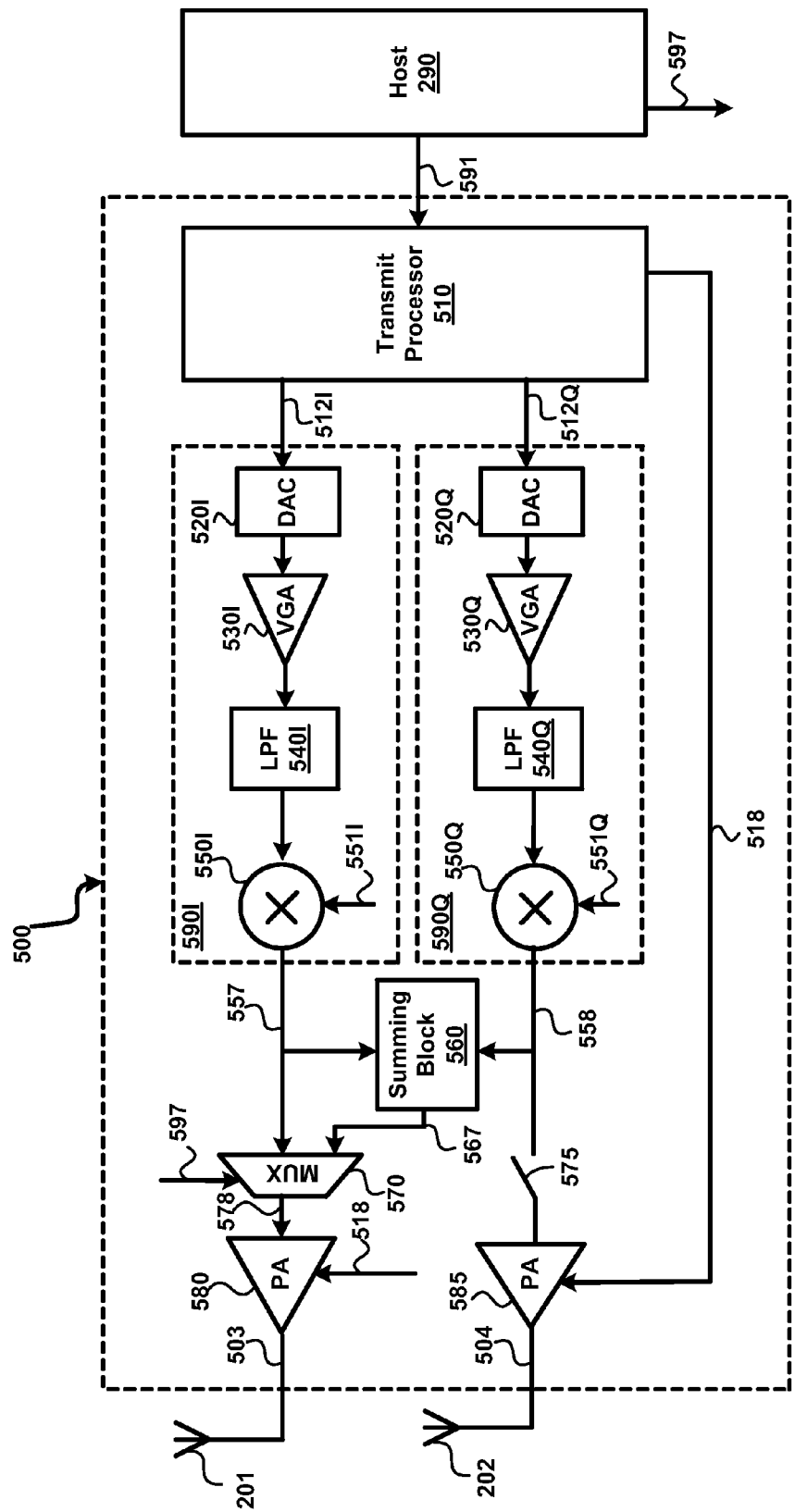
FIG. 5 is a block diagram illustrating the details of a transmitter portion of a transceiver, in an embodiment.

Antennas 201 and 202 may be used by a transmitter portion of transceiver 110A as well, as shown in FIG. 5. Although shown as being separate from receiver 200, receiver 200 may be viewed as including antennas 201 and 202 as well.

Mixer 240I, LPF 250I, VGA 260I and ADC 270I may be viewed as signal processing chain 270I (first signal processing chain). Mixer 240Q, LPF 250Q, VGA 260Q and ADC 270Q may be viewed as signal processing chain 270Q (second signal processing chain). When I-Q demodulation is used, signal processing chains 270I and 270Q represent I (in-phase) and Q (quadrature) processing chains/paths respectively.

Each of antennas 201 and 202 receives a corresponding modulated signal from a wireless or other medium. In the example of FIG. 2, the received signals are assumed to be generated according to Orthogonal Frequency Division Multiplexing (OFDM) in the frequency band specified by WLAN standards or any other type of modulation. Receiver 200 may employ corresponding demodulation techniques, well-known in the relevant arts, for demodulating the signals received via antenna 201 and 202 in SISO and in MIMO modes of operation.

Antennas 201 and 202 provide the respective received signals to LNA 210 and LNA 220 respectively via respective paths 203 and 204. LNAs 210 and 220 provide front-end amplification (with minimal noise addition) to the corresponding signals (on paths 203 and 204) received from the antennas, and generate amplified signals on respective paths 217 and 223. Path 217 is directly connected to mixer 240I.

MUX 230 receives signals 217 and 223 as inputs, and provides one of signals 217 and 223 on path 243 based on the value of select signal 293. Select signal 293 is shown in FIG. 2 as being generated by host 290. However, select signal 293 can instead be generated by baseband processor 280 also. Output 243 of MUX 230 is provided to mixer 240Q.

Mixer 240I receives a local oscillator (LO) signal on path 241I, mixes (multiplies) signal 217 with LO signal 241I, and provides the outputs of the mixing operation to LPF 250I. LPF 250I low-pass filters the output of mixer 240I to reject undesired side-bands generated by mixer 240I, and provides the desired side-band to VGA 260I. VGA 260I provides a desired gain (for example, to amplify the received input to cover the entire dynamic range of ADC 270I). ADC 270I converts the (analog) output of VGA 260I to corresponding digital values, and forwards the digital values on path 278I.

Mixer 240Q receives a local oscillator (LO) signal on path 241Q, mixes (multiplies) signal 243 with LO signal 241Q, and provides the outputs of the mixing operation to LPF 250Q. LPF 250Q low-pass filters the output of mixer 240Q to reject undesired side-bands generated by mixer 240Q, and provides the desired side-band to VGA 260Q. VGA 260Q provides a desired gain (for example, to amplify the received input to cover the entire dynamic range of ADC 270Q). ADC 270Q converts the (analog) output of VGA 260Q to corresponding digital values, and forwards the digital values on path 278Q.

LNAs 210 and 220, and VGAs 260I and 260Q may receive control inputs for setting corresponding gain values via path 281 from baseband processor 280. LO signals 241I and 241Q are generated by corresponding signal generators, not shown in FIG. 2, but assumed to be contained in receiver 200 (or within transceiver 110A which contains receiver 200). When receiver 200 operates to perform I-Q demodulation, LO signals 241I and 241Q are in phase-quadrature (ninety degrees phase difference) with respect to each other. However, when receiver 200 operates in MIMO mode using low-IF (non-zero IF) scheme, there may be no constraint on any specific phase relationship between LO signals 241I and 241Q.

Baseband processor 280 processes the digital values received on each of paths 278I and 278Q to extract the information (e.g., data) carried by signals on paths 217 and 243. Depending on the specific modulation technique (as may be specified by a corresponding standard (such as, for example, WLAN, WiMAX, UMTS, etc., noted above) used in the received modulated signal(s) (via antennas 201 and 202), baseband processor 280 may perform corresponding operations (well-known in the relevant arts) required to demodulate the signals. Assuming, for example, that the signals received via antennas 201 and 202 are OFDM signals (e.g., according to WLAN standards), baseband processor 280 may perform operations such as Fast Fourier Transform (FFT), offset correction, de-interleaving, etc., consistent with demodulation and decoding of an OFDM signal.

In SISO mode of operation, select signal 293 to MUX 230 has a value that selects signal 217 on path 243. Thus, a modulated signal (input modulated signal) received via antenna 201 is provided to each of signal processing chains 270I and 270Q. In an embodiment, in SISO mode, receiver 200 employs direct down-conversion to baseband (i.e., zero IF) technique. Thus, the frequencies of LO signals 241I and 241Q each equal the carrier frequency of the modulated signal received via antenna 201.

Figure 3A:
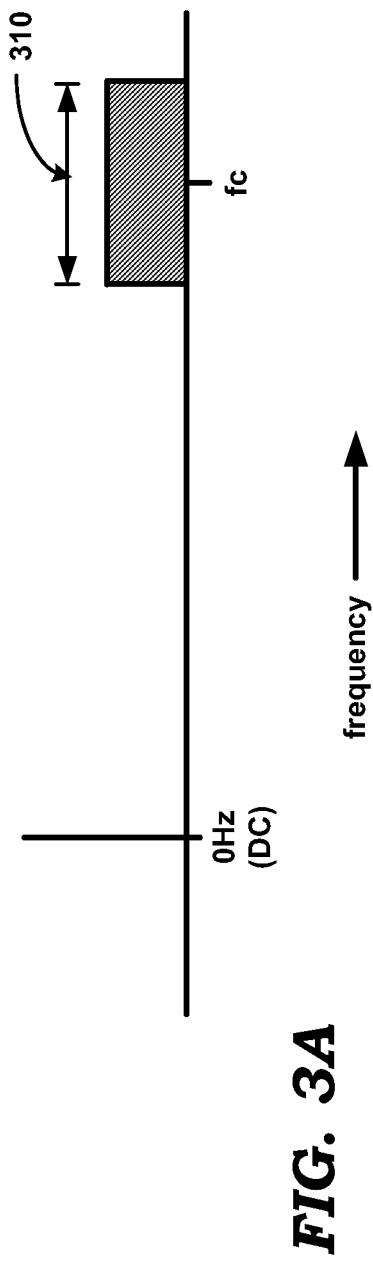
FIG. 3A is an example diagram showing the spectrum of a modulated signal received by the receiver portion of a transceiver.

FIG. 3A shows the frequency band 310 occupied by the modulated signal received by antenna 201. Assuming WLAN operation, frequency fc may correspond to an allocated center frequency in the 2.4 GHz band. LO signals 241I and 241Q each have a frequency equal to fc (the carrier frequency), and mixers 240I and 240Q directly down-convert the modulated signal represented by the frequency band 310 to baseband.

Figure 3B:
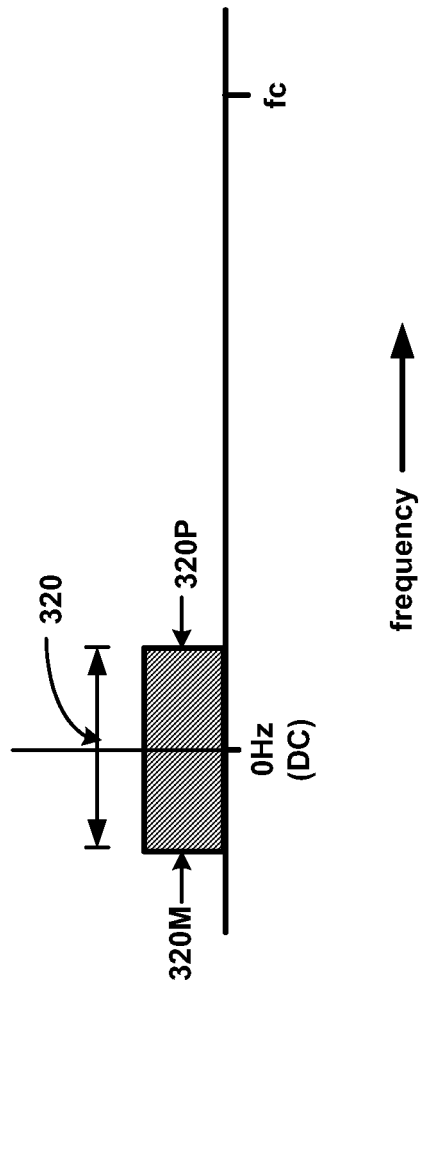
FIG. 3B is an example diagram showing the spectrum of a down-converted signal in a receiver portion of a transceiver in a SISO mode of operation.

The frequency band 320 occupied by the outputs 245I and 245Q of mixers 240I and 240Q respectively (i.e., the frequency band of the 'baseband outputs' on each of paths 278I (first baseband output) and 278Q (second baseband output)) is shown in FIG. 3B. Outputs 245I and 245Q respectively contain the first baseband output and the second baseband output. Since direct down-conversion (zero-IF) is employed, baseband processor 280 employs I-Q demodulation on the baseband signal represented by frequency band 320 to recover the information/data contained in it. Thus, signals 278I and 278Q respectively represent the in-phase component (I) and the quadrature component (Q) of the modulated signal after down-conversion. In particular, baseband processor 280 processes positive side-band 320P and negative side-band 320M to demodulate signal 320 to recover the data contained in it. The manner in which such processing is done may be performed in a known way. Due to the direct down-conversion approach, there is no degradation in the demodulated data due to potential image frequencies/image signals.

In MIMO mode of operation, select signal 293 to MUX 230 has a value that selects signal 223 on path 243. Thus in MIMO mode, a modulated signal (first modulated signal) received via antenna 201 is provided to signal processing chain 270I, while another modulated signal (second modulated signal) received via antenna 202 is provided to signal processing chain 270Q. The modulated signal received by antenna 201 and provided on path 203 is 'physically' separate and different from the modulated signal received by antenna 202 and provided on path 204.

Since only one channel (signal processing chain 270I for the modulated signal on path 217, and signal processing chain 270Q for the modulated signal on path 223 or 243) is available for processing each of the corresponding modulated signals received at the respective antennas 201 and 202 in MIMO mode, receiver 200 employs a low-IF (low intermediate frequency) in MIMO mode. Thus, the frequencies of LO signals 241I and 241Q are generated such that the corresponding (desired side bands of) outputs of mixers 240I and 240Q are centered at the IF. Thus, the frequencies of LO signals 241I and 241Q in MIMO mode may be either lower or higher than the center frequency of the corresponding modulated signals on paths 217 and 223 (respectively known as upper side or lower side injection).

Figure 4A:
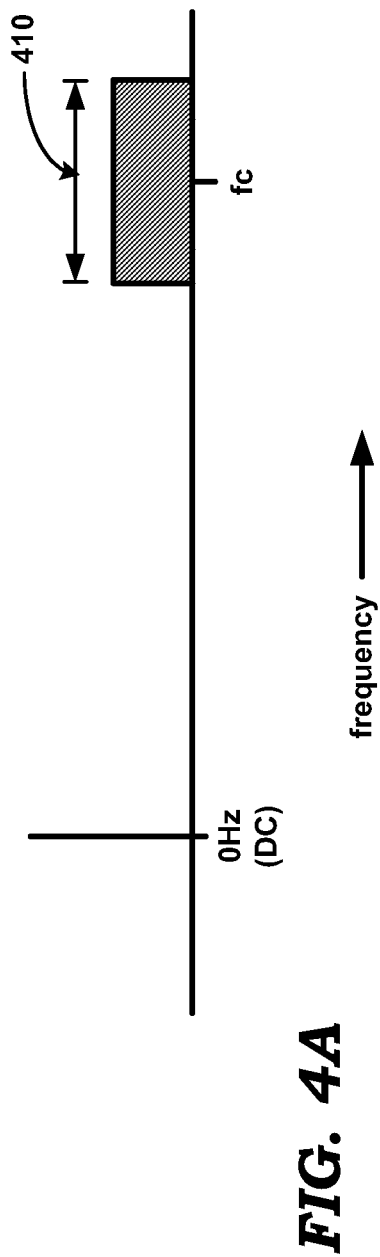
FIG. 4A is an example diagram showing the spectrum of a modulated signal received by the receiver portion of a transceiver.
Figure 4B:
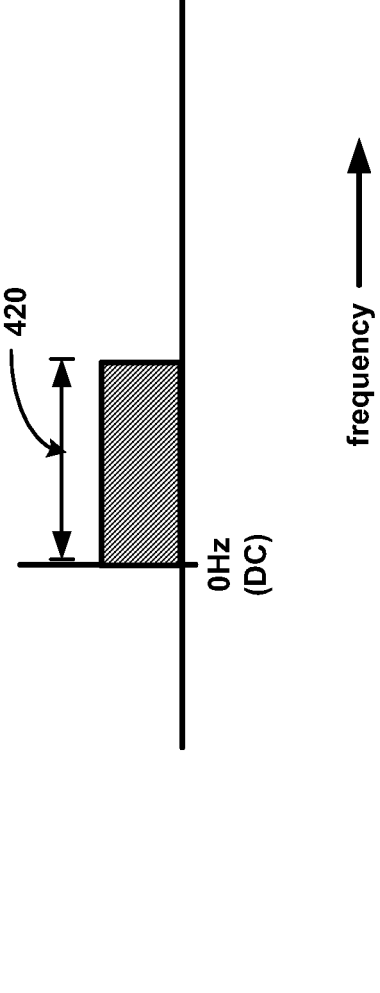
FIG. 4B is an example diagram showing the spectrum of a down-converted signal in a receiver portion of a transceiver in a MIMO mode of operation.

FIG. 4A shows the frequency band 410 occupied by each of the modulated signals on paths 217 and 223. Frequency band 410 may represent the same band of frequencies as band 310 of FIG. 3. Again, assuming WLAN operation, frequency fc may correspond to an allocated centre frequency in the 2.4 GHz band. LO signals 241I and 241Q each have a frequency to down-convert modulated signal 410 to IF. The frequency band 420 occupied by the lower side bands (desired bands) of each of the outputs of mixers 240I and 240Q (also the frequency band of signals on each of paths 278I (first down-converted signal) and 278Q (second down-converted signal)) is shown in FIG. 4B. Frequency band 420 of FIG. 4B is shown merely as an example. The specific down-converted band may depend on the value of IF used in receiver 200. Baseband processor 280 demodulates the IF signal (first down-converted signal) on path 278I to recover the information contained in signal 217, and demodulates the IF signal (second down-converted signal) on path 278Q to recover the information contained in signal 223. The demodulation may be performed in a known way, and may include operations such as FFT, de-interleaving, offset correction, etc., consistent with demodulation and decoding of OFDM signals.

The use of low-IF (rather than zero IF) in MIMO mode may potentially result in image signals being contained in the down-converted signals (band 420) on each of paths 278I and 278Q. Since only one channel (signal processing chain 270I for modulated signal on path 217, and signal processing chain 270Q for modulated signal on path 223) is available for processing each of the corresponding modulated signals received at the respective antennas 201 and 202 in MIMO mode, I-Q demodulation cannot be used to reject image signals that could potentially be present in the down-converted signals on paths 271I and 271Q. Hence, in MIMO mode, signal degradation (potentially equal to 3 dB) may be incurred due to image signals. However, assuming cost is not a concern, such image signals may be prevented from entering receiver 200 by the use of corresponding image-reject filters in the respective signal paths, (for example immediately following antenna 201 and 202 in the signal path). Further, potential degradation (also termed de-sensing) due to image frequencies may be compensated for by the use of a baseband channel(s) implemented otherwise for processing input signals conforming to a different standard or modulation type that may be contained in receiver 200 (assuming such baseband channel(s) are not being used for their intended/regular operations).

It may be appreciated that one of the signal processing chains (270Q in the example of FIG. 2), is re-used to enable reception and processing of an additional modulated signal, thereby enabling MIMO operation, with minimal additional circuitry. Thus, receiver 200, with the addition of LNA 220 and MUX 230 to the rest of the circuitry/components/blocks required for SISO operation, is enabled for MIMO operation. It is noted that in a prior approach, the entire signal processing chain (270I plus 270Q) is replicated for processing an additional input signal, thereby leading to higher costs. Receiver 200 implemented as described above enables substantial reduction in implementation area required for MIMO operation.

It is noted that the additional LNA (LNA 220 in FIG. 2) required to enable MIMO operation may be used from the front-end portion of a transceiver implemented according to a technology other than WLAN (such as for example, bluetooth) that may typically be contained in a device such as a mobile phone, transceiver 110A also being assumed to be implemented in the same device. In such a scenario, the baseband portions of such a different-technology transceiver may be used to mitigate the effects of degradation due to image frequencies.

Figure 7:
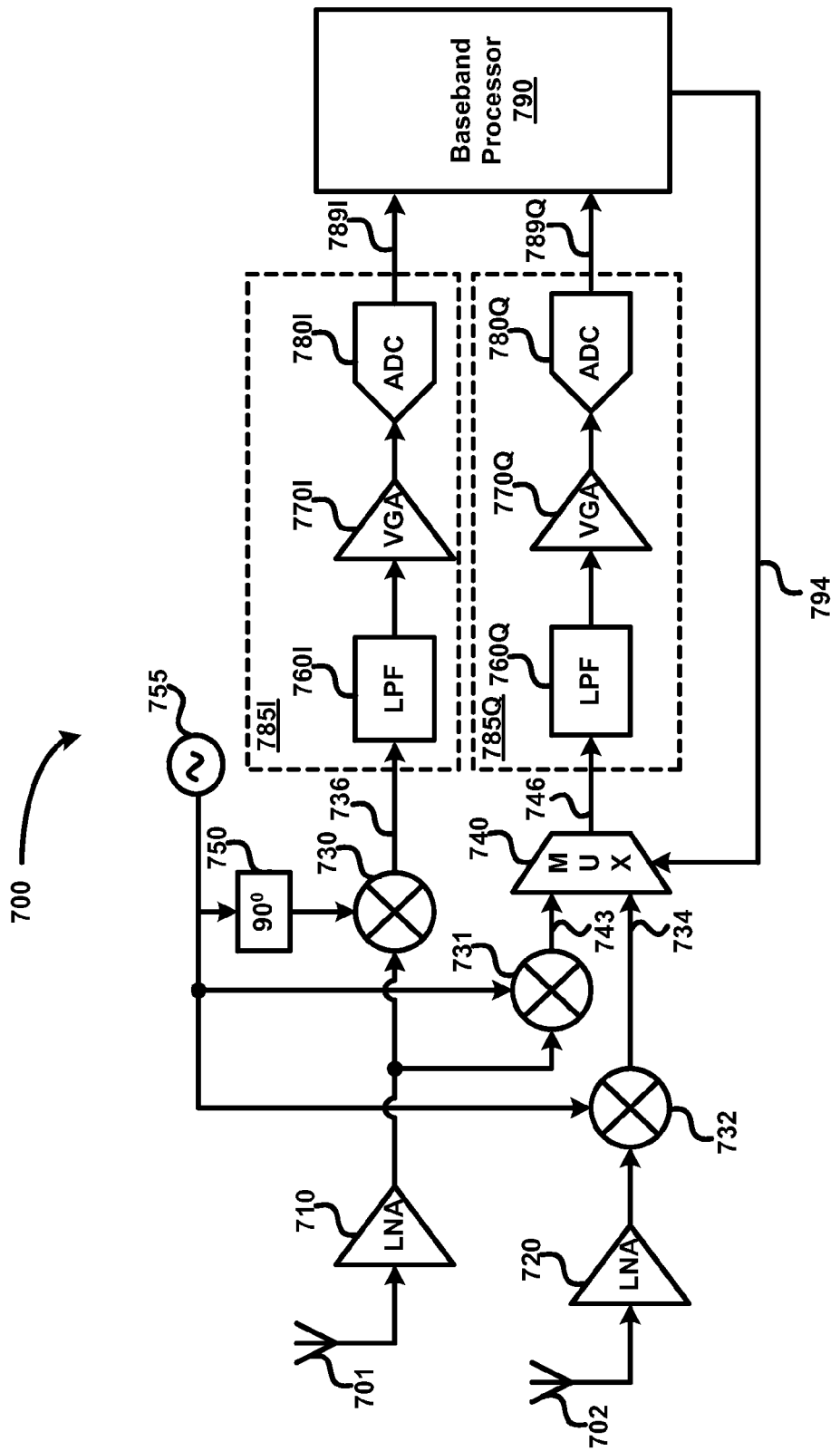
FIG. 7 is a block diagram illustrating the details of a receiver portion of a transceiver, in an alternative embodiment.

It is also noted that, instead of implementing MUX 230 to multiplex radio frequency (RF) signals received at the antennas (201 and 202), MUX 230 may be implemented to multiplex signals obtained after down-conversion by corresponding mixing operations. An embodiment of a receiver in which multiplexing (similar to that performed by MUX 230) is implemented after down-conversion is shown in FIG. 7. Receiver 700 of FIG. 7 is shown containing LNAs 710 and 720, mixers 730, 731 and 732, oscillator 755, phase shifter 750, MUX or RF-switch 740, LPFs 760I and 760Q, VGAs 770I and 770Q, ADCs 780I and 780Q and baseband processor 790. The operation of receiver 700 is substantially similar to the operation of receiver 200 of FIG. 2, and only the differences are described in detail.

LPF 760I, VGA 770I and ADC 780I may together be viewed as signal processing chain 785I (first signal processing chain), while LPF 760Q, VGA 770Q and ADC 780Q may together be viewed as signal processing chain 785Q (second signal processing chain). When direct down-conversion and I-Q demodulation are used (as in SISO mode of operation of receiver 700), chains 785I and 785Q represent in-phase and quadrature-phase processing chains/paths respectively, and signals on path 789I and 789Q respectively represent a first baseband output and a second baseband output. When low-IF techniques are used (as in MIMO mode of operation of receiver 700) signals on path 789I and 789Q respectively represent a first down-converted output and a second down-converted output.

Antennas 701 and 702 operate similar to antennas 201 and 202, and may be shared with a transmitter portion (e.g., transmitter 500) of transceiver 110A. LPF 760I, VGA 770I and ADC 780I correspond respectively to LPF 250I, VGA 260I and ADC 270I, and signal processing chain 785I operates similar to signal processing chain 270I of FIG. 2, except that signal processing chain 785I receives and processes signals (on path 736) obtained after down-conversion. Similarly, LPF 760Q, VGA 770Q and ADC 780Q correspond respectively to LPF 250Q, VGA 260Q and ADC 270Q, and signal processing chain 785Q operates similar to signal processing chain 270Q of FIG. 2, except that chain 785Q receives and processes signals (on path 746) obtained after down-conversion. Baseband processor 790 operates similar to baseband processor 280 of FIG. 2. In SISO mode, signals on paths 736 and 746 respectively represent the I component and the Q component of the input signal received via antenna 201 and after down-conversion in the respective mixers.

Each of mixers 731 and 732 receives a local oscillator (LO) signal from oscillator (signal generator) 755. Mixer 730 receives a LO signal (from oscillator 755) that is ninety degrees phase-shifted with respect to the LO signals received by mixers 731 and 732, the ninety degree phase shift being performed by phase shifter 750. Mixer 730 multiplies the outputs of LNA 710 and phase shifter 750 to generate a down-converted signal on path 736. Mixer 731 multiplies the output of LNA 710 with the LO received from oscillator 755 to generate a corresponding down-converted signal on path 743. Mixer 732 multiplies the output of LNA 720 with the LO received from oscillator 755 to generate a corresponding down-converted signal on path 734.

MUX (or RF switch) 740 provides one of signals 743 and 734 on path 746 depending on the value of select signal 794. In SISO mode of operation, direct down-conversion (zero IF) and I-Q demodulation are used, select signal 794 has a value that selects signal 743 on path 746, and baseband processor 790 processes the corresponding I and Q baseband signals on respective paths 789I and 789Q to demodulate an input signal received via antenna 701. Signals on paths 736 and 746 represent respectively (or contain) the I and Q baseband signals 789I and 789Q.

In MIMO mode of operation, signal processing chain 785I receives a down-converted signal obtained by down-conversion of the signal received by antenna 201, and signal processing chain 785Q receives a down-converted signal obtained by down-conversion of the signal received by antenna 202. Select signal 794 has a value that selects signal 734 on path 746, low-IF technique is used, and baseband processor 790 processes the corresponding down-converted outputs on respective paths 789I and 789Q to demodulate the respective (and different) input signals received via antennas 701 and 702.

Corresponding approaches to provide MIMO (in addition to SISO) capabilities using only minimal additional circuitry and area can be used in the transmitter portion of transceiver 110A as well, as described next briefly.

3. Transmitter

FIG. 5 is a block diagram illustrating the details of a transmitter portion of a transceiver (e.g., transceiver 110A) in an embodiment. Transmitter 500 is shown containing transmit processor 510, digital-to-analog converters (DAC) 520I and 520Q, variable gain amplifiers (VGA) 530I and 530Q, low-pass filters 540I and 540Q, mixers 550I and 550Q, summing block 560, multiplexer (MUX) 570, and power amplifiers (PA) 580 and 585. Host 290 and antennas 201 and 202 are also shown in FIG. 5.

DAC 520I, VGA 530I, LPF 540I, and mixer 550I may be viewed as signal processing chain 590I. DAC 520Q, VGA 530Q, LPF 540Q, and mixer 550Q may be viewed as signal processing chain 590Q. When I-Q modulation is used, signal processing chains 590I and 590Q represent I (in-phase) and Q (quadrature) processing chains/paths respectively.

Antennas 201 and 202 are used to transmit corresponding modulated signals received from power amplifiers 580 and 585 respectively. Although shown as being separate from transmitter 500, transmitter 500 may be viewed as including antennas 201 and 202 as well. Antennas 201 and 202 may be shared between receiver 200 (FIG. 2) and transmitter 500, as described below with respect to FIG. 6.

Transmit processor 510 receives data to be transmitted from host 290 on path 591, and may perform several operations such as Inverse-FFT (IFFT), data interleaving, etc., consistent with the desired modulation technique (assumed to be OFDM according to WLAN standards in this description) on the received data. When operating consistent with other standards such as WiMAX, UMTS, etc., noted above, the operations may be correspondingly different.

Although shown as a separate component, transmit processor 510 may be contained within baseband processor 280 of FIG. 2.

When operating in SISO mode, transmit processor 510 generates I and Q data corresponding to data received on path 591, and generates corresponding I-data (in-phase data) on path 512I and Q-data (quadrature-phase data) on path 512Q. As described below, the I-data and Q-data are used to modulate respective carriers and then summed to form a single modulated signal, which is then transmitted.

When operating in MIMO mode, transmit processor 510 receives two separate data streams on path 591, and provides one data stream (first set of data) on path 512I and the other data stream (second set of data) on path 512Q. As described below, each of the data streams is used to form a corresponding modulated signal, each of which is then transmitted. The two data streams may contain identical data values or different data values.

DAC 520I converts the data received on path 512I to an analog signal (current or voltage), and provides the analog signal to VGA 530I. VGA 530I provides a desired level of gain for the analog signal and provides an amplified analog signal to LPF 540I. LPF 540I performs low-pass filtering on the received analog signal, and provides a filtered analog signal to mixer 550I. In SISO mode the filtered analog signal 550I represents the analog value of the I-component of the data to be transmitted using I-Q modulation. Mixer 550I receives a LO (carrier) signal on path 551I and multiplies the carrier signal by the analog I-signal received from LPF 540I to vary the amplitude and/or phase of LO signal 551I consistent with the modulation technique used.

DAC 520Q converts the data received on path 512Q to an analog signal (current or voltage), and provides the analog signal to VGA 530Q. VGA 530Q provides a desired level of gain for the analog signal and provides an amplified analog signal to LPF 540Q. LPF 540Q performs low-pass filtering on the received analog signal, and provides a filtered analog signal to mixer 550Q. In SISO mode, the filtered analog signal represents the analog value of the Q-component of the data to be transmitted using I-Q modulation. Mixer 550Q receives a LO (carrier) signal on path 551Q and multiplies the carrier signal by the analog Q-signal received from LPF 540Q to vary the amplitude and/or phase of LO signal 551Q consistent with the modulation technique used.

In SISO mode, LO signals 551I and 551Q are in phase quadrature with respect to each other. Summing block 560 adds the output of mixers received on paths 557 (first analog output) and 558 (second analog output), and generates an IQ modulated signal (first modulated signal) on path 567. In SISO mode, select signal 597 provided to MUX 570 has a value that selects signal 567 on output path 578. Power amplifier (PA) 580 provides power-amplification to the signal received on path 578, and provides the power amplified signal on path 503 to antenna 201, which transmits the signal 503. In SISO mode, switch 575 is open and PA 585 and antenna 202 are disconnected from path 558. It is noted that in SISO mode, direct up-conversion may be used, and the frequencies of LO signals 551I and 551Q equal the carrier frequency of the modulated signal transmitted by antenna 201.

In MIMO mode of operation, separate sets of data are received on paths 512I and 512Q. The separate data sets may contain identical data values or different data values. Also, in MIMO mode, IF modulation is used. Thus, the data stream/set received on path 512I modulates a carrier (LO signal 551I) to generate one modulated signal (second modulated signal) on path 557, and the data stream/set received on path 512Q modulates a carrier (LO signal 551Q) to generate another modulated signal (third modulated signal) on path 558.

In MIMO mode, select signal 597 provided to MUX 570 has a value that selects signal 557 on output path 578. Also, switch 575 is closed, and PA 585 and antenna 202 are connected to path 558. Power amplifier (PA) 580 provides power-amplification to the signal received on path 578 and provides the power-amplified signal to antenna 201 (via path 503), which transmits the signal. PA 585 provides power-amplification to the signal received on path 558 and provides the power-amplified signal to antenna 202 (via path 504), which transmits the signal. Although not shown in FIG. 5, more than one stage of up-conversion may be used in transmitter 500 in MIMO mode. Further, though not shown in FIG. 5, filters to filter the output of mixers 550I and 550Q may also be present.

Alternatively, assuming transmit processor 510 may receive (or generate) separate sets of (I and Q) data corresponding to data to be transmitted on each of the modulated signals (via antennas 201 and 202 respectively). Each of the sets of I and Q data may modulate corresponding I and Q digital carriers (also generated within transmit processor 510). The digital carriers corresponding to each set are generated to have a phase difference of 90 degrees and may have a lower frequency than the LO signals (551I and 551Q) received by mixers 550I and 550Q. The sum of each of the sets of I and Q modulated signals (still in the digital domain) are added to generate corresponding digital IF signals on respective paths 512I and 512Q. DACs 520I and 520Q convert the IF signals to analog form. Mixers 550I and 550Q then up-convert the analog IF signal received from the respective LPFs to the final radio frequency (RF). The final RF signals on paths 557 and 558 thus generated are transmitted as respective modulated signals via the respective PAs and antennas 201 and 202.

It may be appreciated that one of the signal processing chains (590Q in the example of FIG. 5), is re-used to enable transmission of an additional modulated signal, thereby enabling MIMO operation, with minimal additional circuitry. Thus, transmitter 500, with the addition of PA 585, MUX 570 to the rest of the circuitry/components/blocks required for SISO operation, is enabled for MIMO operation. Transceiver 110A implemented using receiver 200 (FIG. 2) and transmitter 500 (FIG. 5) enables substantial reduction in implementation area while still enabling MIMO operation.

Figure 6:
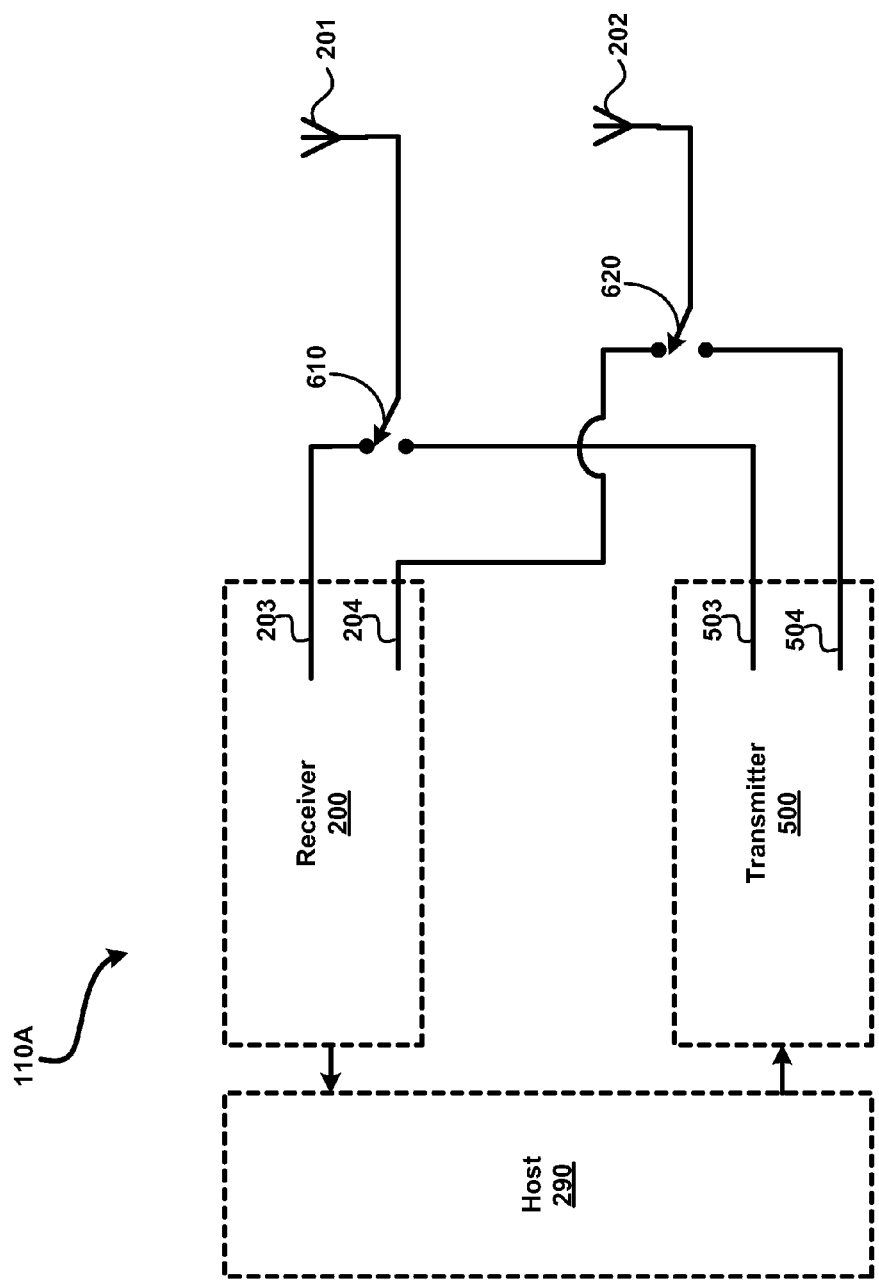
FIG. 6 is a diagram used to illustrate the manner in which antennas are shared between a receiver and a transmitter of a transceiver in an embodiment.

FIG. 6 illustrates the manner in which antennas 201 and 202 are shared between receiver 200 and transmitter 500 in an embodiment. In receive-mode, switches 610 and 620 are connected to paths 203 and 204 respectively, while in transmit-mode switches 610 and 620 are connected to paths 503 and 504 respectively.

In the illustrations of FIGS. 2, 5, 6 and 7 although terminals/nodes are shown with direct connections to various other terminals, it should be appreciated that additional components (as suited for the specific environment) may also be present in the path, and accordingly the connections may be viewed as being electrically coupled to the same connected terminals.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A wireless receiver comprising:
   a first signal processing chain;
   a first antenna coupled to the first signal processing chain;
   a second signal processing chain;
   a second antenna;
   circuitry for selectively coupling one of the first and second antennas to the second signal processing chain; and
   a baseband processor;
   wherein, in a single-input single-output (SISO) mode of operation, each of the first signal processing chain and the second signal processing chain is coupled to receive a same input modulated signal from the first antenna as input, and respectively generates a first baseband output and a second baseband output, the baseband processor to process the first baseband output and second baseband output to demodulate the input modulated signal, and
   wherein, in a multiple-input multiple-output (MIMO) mode of operation, the first signal processing chain is coupled to receive a first modulated signal from the first antenna and to generate a first down-converted output, wherein the second signal processing chain is coupled to receive a second modulated signal from the second antenna and to generate a second down-converted output, wherein the baseband processor processes the first down-converted signal to demodulate the first modulated signal and the second down-converted signal to demodulate the second modulated signal.

2. The wireless receiver of claim 1, further comprising:
   a first antenna and a second antenna,
   wherein, in the SISO mode, each of the first signal processing chain and the second signal processing chain is coupled to the first antenna to receive the same input modulated signal, the second antenna being decoupled from each of the first signal processing chain and the second signal processing chain,
   wherein, in the MIMO mode, the first signal processing chain is coupled to the first antenna to receive the first modulated signal, the second signal processing chain is coupled to the second antenna to receive the second modulated signal, the first antenna being decoupled from the second signal processing chain, and the second antenna being decoupled from the first signal processing chain.

3. The wireless receiver of claim 2, wherein each of the input modulated signal, the first modulated signal and the second modulated signal is formed according to one of WLAN, WiMAX, UMTS and LTE standards.

4. The wireless receiver of claim 2, wherein the first signal processing chain comprises a first mixer and the second signal processing chain comprises a second mixer,
   wherein the frequencies of the local oscillator signals generated by each of the first mixer and the second mixer equal a carrier frequency of the input modulated signal in the SISO mode, the wireless receiver employing direct down-conversion and I-Q demodulation in the SISO mode, and
   wherein, in the MIMO mode, the frequency of the local oscillator signal generated by the first mixer is different from a carrier frequency of the first modulated signal and the frequency of the local oscillator signal generated by the second mixer is different from a carrier frequency of the second modulated signal, the wireless receiver employing low intermediate-frequency (low-IF) techniques in MIMO mode.

5. The wireless receiver of claim 4, wherein the first signal processing chain further comprises:
   a first low pass filter (LPF) coupled to receive an output of the first mixer and to provide low-pass filtering on the output of the first mixer;
   a first variable gain amplifier (VGA) coupled to receive the output of the first LPF and to amplify the output of the first LPF; and
   a first analog to digital converter (ADC) coupled to receive the output of the first VGA and to generate a first set of digital values representing the output of the first VGA, wherein the first set of digital values represent the first baseband output in the SISO mode, and represent the first down-converted output in the MIMO mode.

6. The wireless receiver of claim 5, wherein the second signal processing chain further comprises:
   a second LPF coupled to receive an output of the second mixer and to provide low-pass filtering on the output of the second mixer;
   a second VGA coupled to receive the output of the second LPF and to amplify the output of the second LPF; and
   a second ADC coupled to receive the output of the second VGA and to generate a second set of digital values representing the output of the second VGA, wherein the second set of digital values represent the second baseband output in the SISO mode, and represent the second down-converted output in the MIMO mode.

7. The wireless receiver of claim 2, wherein in the SISO mode, the first signal processing chain and the second signal processing chain are coupled to receive respective I and Q components obtained after down-conversion of the input modulated signal, the wireless receiver employing direct down-conversion in SISO mode, and
   wherein, in the MIMO mode, the first signal processing chain is coupled to receive a down-converted signal obtained by down-conversion of the first modulated signal, and the second signal processing chain is coupled to receive a down-converted signal obtained by down-conversion of the second modulated signal, the wireless receiver employing low intermediate frequency (Low-IF) techniques in MIMO mode.

8. The wireless receiver of claim 7, wherein the first signal processing chain comprises a first low pass filter, a first variable gain amplifier, and a first analog to digital converter,
   wherein the second signal processing chain comprises a second low pass filter, a second variable gain amplifier, and a second analog to digital converter.

9. The wireless receiver of claim 1, wherein the circuitry for selectively coupling one of the first and second antennas to the second signal processing chain is a multiplexer.

10. A wireless transmitter comprising:
    a first signal processing chain;
    a first antenna coupled to the first signal processing chain;
    a second signal processing chain;
    a second antenna;
    circuitry for selectively coupling one of the first and second antennas to the second signal processing chain; and
    a transmit processor;
    wherein, in a single-input single-output (SISO) mode of operation, the transmit processor generates in-phase (I) data and quadrature-phase (Q) data corresponding to each data value to be transmitted on a first modulated signal from the first antenna, the first signal processing chain to receive the I data and to generate a first analog output, the second signal processing chain to receive the Q data and to generate a second analog output, wherein the first analog output and the second analog output are combined to form the first modulated signal, wherein, in a multiple-input multiple-output (MIMO) mode of operation, the transmit processor generates a first set of data to be transmitted on a second modulated signal from the first antenna and a second set of data to be transmitted on a third modulated signal from the second antenna, the first signal processing chain to receive the first set of data and to generate the second modulated signal, and the second signal processing chain to receive the second set of data and to generate the third modulated signal.

11. The wireless transmitter of claim 10, wherein the first signal processing chain comprises a first mixer and the second signal processing chain comprises a second mixer, wherein the frequencies of the local oscillator signals generated by each of the first mixer and the second mixer equal a carrier frequency of the first modulated signal in the SISO mode, the wireless transmitter employing direct up-conversion in the SISO mode, and wherein, in the MIMO mode, the first set of data modulates a carrier at an intermediate frequency (IF) to generate a first IF signal and the second set of data modulates another carrier at IF to generate a second IF signal, wherein the first mixer generates the second modulated signal by up-converting the first IF signal to radio frequency and the second mixer generates the third modulated signal by up-converting the second IF signal to radio frequency.

12. The wireless transmitter of claim 11, further comprising:
a first antenna and a second antenna,
wherein, in the SISO mode, the first modulated signal is transmitted by the first antenna the second antenna being decoupled from the second signal processing chain,
wherein, in the MIMO mode, the second modulated signal is transmitted by the first antenna and the third modulated signal is transmitted by the second antenna.

13. The wireless transmitter of claim 12, wherein the first signal processing chain further comprises:
a first digital to analog converter (DAC) to receive the in-phase data in SISO mode, and the first set of data in the MIMO mode, and to convert the in-phase data and the first set of data to corresponding analog signals; and
a second digital to analog converter (DAC) to receive the quadrature-phase data in SISO mode, and the second set of data in the MIMO mode, and to convert the quadrature-phase data and the second set of data to corresponding analog signals.

14. The wireless transmitter of claim 13, wherein the first signal processing chain further comprises a first variable gain amplifier (VGA) and a first low-pass filter (LPF), and the second signal processing chain further comprises a second VGA and a second LPF,
wherein the first VGA amplifies an analog signal received from the first DAC, the first LPF to low-pass-filter the amplified output of the first VGA, and
wherein the second VGA amplifies an analog signal received from the second DAC, the second LPF to low-pass-filter the amplified output of the second VGA.

15. The wireless transmitter of claim 11, wherein each of the first modulated signal, the second modulated signal and the third modulated signal is formed according to one of WLAN, WiMAX, UMTS and LTE standards.

16. The wireless transmitter of claim 10, wherein the circuitry for selectively coupling one of the first and second antennas to the second signal processing chain is a multiplexer.

17. A wireless device comprising:
a receiver;
a transmitter;
a first antenna and a second antenna;
wherein the receiver comprises:
a first signal processing chain;
a first antenna coupled to the first signal processing chain;
a second signal processing chain;
a second antenna;
circuitry for selectively coupling one of the first and second antennas to the second signal processing chain; and
a baseband processor;
wherein, in a single-input single-output (SISO) mode of operation, each of the first signal processing chain and the second signal processing chain is coupled to receive a same input modulated signal from the first antenna as input, and respectively generates a first baseband output and a second baseband output, the baseband processor to process the first baseband output and second baseband output to demodulate the input modulated signal, and
wherein, in a multiple-input multiple-output (MIMO) mode of operation, the first signal processing chain is coupled to receive a first modulated signal from the first antenna and to generate a first down-converted output, wherein the second signal processing chain is coupled to receive a second modulated signal from the second antenna and to generate a second down-converted output, wherein the baseband processor processes the first down-converted signal to demodulate the first modulated signal and the second down-converted signal to demodulate the second modulated signal,
wherein each of the input modulated signal, the first modulated signal and the second modulated signal is formed according to one of WLAN, WiMAX, UMTS and LTE standards,
wherein the transmitter comprises:
a third signal processing chain;
a fourth signal processing chain;
circuitry for coupling the first antenna to the third signal processing chain and for selectively coupling one of the first and second antennas to the fourth signal processing chain; and
a transmit processor;
wherein, in a single-input single-output (SISO) mode of operation, the transmit processor generates in-phase (I) data and quadrature-phase (Q) data corresponding to each data value to be transmitted by the first antenna in the form of a third modulated signal, the third signal processing chain to receive the I data and to generate a first analog output, the fourth signal processing chain to receive the Q data and to generate a second analog output, wherein the first analog output and the second analog output are combined to form the third modulated signal,
wherein, in a multiple-input multiple-output (MIMO) mode of operation, the transmit processor generates a first set of data to be transmitted by the first antenna in the form of a fourth modulated signal and a second set of data to be transmitted by the second antenna in the form of a fifth modulated signal, the third signal processing chain to receive the first set of data and to generate the fourth modulated signal, and the fourth signal processing chain to receive the second set of data and to generate the fifth modulated signal, wherein each of the third modulated signal, the fourth modulated signal and the fifth modulated signal is formed according to one of WLAN, WiMAX, UMTS and LTE standards.

18. The wireless device of claim 17, wherein the circuitry for selectively coupling one of the first and second antennas to the second signal processing chain is a multiplexer and the circuitry for selectively coupling one of the first and second antennas to the fourth signal processing chain is a multiplexer.

* * * * *